US009445226B2

United States Patent
Castagnoli et al.

(10) Patent No.: US 9,445,226 B2
(45) Date of Patent: Sep. 13, 2016

(54) METHOD FOR IMPROVING LOCATION ACCURACY IN MULTI-CHANNEL WIRELESS NETWORKS

(71) Applicant: Aruba Networks, Inc., Sunnyvale, CA (US)

(72) Inventors: Neal Castagnoli, Morgan Hill, CA (US); Peter Thornycroft, Los Altos, CA (US); Berend Dunsbergen, San Jose, CA (US); Jie Jiang, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 94 days.

(21) Appl. No.: 14/170,336

(22) Filed: Jan. 31, 2014

(65) Prior Publication Data
US 2015/0219742 A1 Aug. 6, 2015

(51) Int. Cl.
| | |
|---|---|
| *H04W 24/00* | (2009.01) |
| *H04W 4/02* | (2009.01) |
| *G01S 5/00* | (2006.01) |
| *G01S 5/14* | (2006.01) |

(52) U.S. Cl.
CPC ............. *H04W 4/02* (2013.01); *G01S 5/0081* (2013.01); *G01S 5/14* (2013.01)

(58) Field of Classification Search
CPC ............. H04W 88/08; H04W 64/00; H04W 36/0088; H04W 36/30; H04W 40/20
USPC ........................................ 370/331, 311, 329
See application file for complete search history.

(56) References Cited

U.S. PATENT DOCUMENTS

| | | | | |
|---|---|---|---|---|
| 7,492,753 | B2* | 2/2009 | Smavatkul | H04W 74/06 370/346 |
| 2005/0138451 | A1* | 6/2005 | Simpson et al. | 713/320 |
| 2006/0187864 | A1* | 8/2006 | Wang | H04W 48/12 370/311 |
| 2009/0092101 | A1* | 4/2009 | Busch | H04W 16/10 370/332 |
| 2010/0003988 | A1* | 1/2010 | Buckley et al. | 455/436 |
| 2010/0303039 | A1* | 12/2010 | Zhang et al. | 370/331 |
| 2012/0224484 | A1* | 9/2012 | Babiarz et al. | 370/235 |
| 2012/0302261 | A1* | 11/2012 | Tinnakornsrisuphap | G01S 5/0226 455/456.4 |
| 2013/0235852 | A1* | 9/2013 | Segev | H04W 72/044 370/336 |
| 2014/0106740 | A1* | 4/2014 | Zhou et al. | 455/423 |
| 2014/0119279 | A1* | 5/2014 | Han | H04W 4/00 370/328 |
| 2014/0120893 | A1* | 5/2014 | Malladi et al. | 455/418 |
| 2014/0254551 | A1* | 9/2014 | Chaponniere et al. | 370/331 |

* cited by examiner

*Primary Examiner* — Dang Ton
*Assistant Examiner* — Sai Aung
(74) *Attorney, Agent, or Firm* — Hewlett Packard Enterprise Patent Department

(57) ABSTRACT

The present disclosure discloses a method and network device for improving location accuracy in multi-channel wireless networks. Specifically, to coordinate with other Access Points (APs) and improve location accuracy of client devices, each access point can (a) obtain a schedule of another neighboring AP; (b) switch to the operating channel of the neighboring AP at a scheduled time for communication exchanges between the neighboring AP and the client device, (c) listen to the communication exchanges between the neighboring AP and the client device; (d) collecting signal samples, e.g., signal strength associated with messages originated from the client device; and (e) send the report to the location engine to allow the location engine collect more signal samples associated with the client device, thereby more accurately determine the location of the client device; etc.

18 Claims, 8 Drawing Sheets

METHOD FOR IMPROVING LOCATION ACCURACY IN MULTI-CHANNEL WIRELESS NETWORKS

FIELD

The present disclosure relates to location services in a wireless local area network. In particular, the present disclosure relates to improve location accuracy in multi-channel wireless networks through the coordination of receiving and transmitting functions of wireless access points with regards to wireless devices.

BACKGROUND

Wireless digital networks, such as networks operating under the current Electrical and Electronics Engineers (IEEE) 802.11 standards, are spreading in their popularity and availability. In a wireless local area network (WLAN) deployment, a number of clients can be connected to the same wireless network via one or more access points. The wireless access points usually can track the location of associated client devices, and use such location information to provide location-based services.

In certain scenarios, however, the access points cannot track the location of the client devices well. This is because the access points usually rely on IEEE 802.11 standard defined protocol, in which a client device will periodically send out probe requests that would allow access points in a wireless network to determine the location of the client device. These probe requests are transmitted infrequently by some client devices, and therefore may not provide enough information that is sufficient to accurately locate such client devices.

Moreover, recently, some mobile device manufacturers have deprecated the use of the client probing protocol for the benefit of preserving device battery life. Thus, there will be even fewer probe requests received from client devices from particular manufacturers.

On the other hand, the location accuracy in a multi-channel network depends on how many and how often access points in a WLAN receives probe requests from a particular client device. In general, the more probe requests that the access points receives from the particular client device during a particular time period, the more accurate the network can use information retrieved from these probe request to accurately determine the client device's location around the particular time period.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
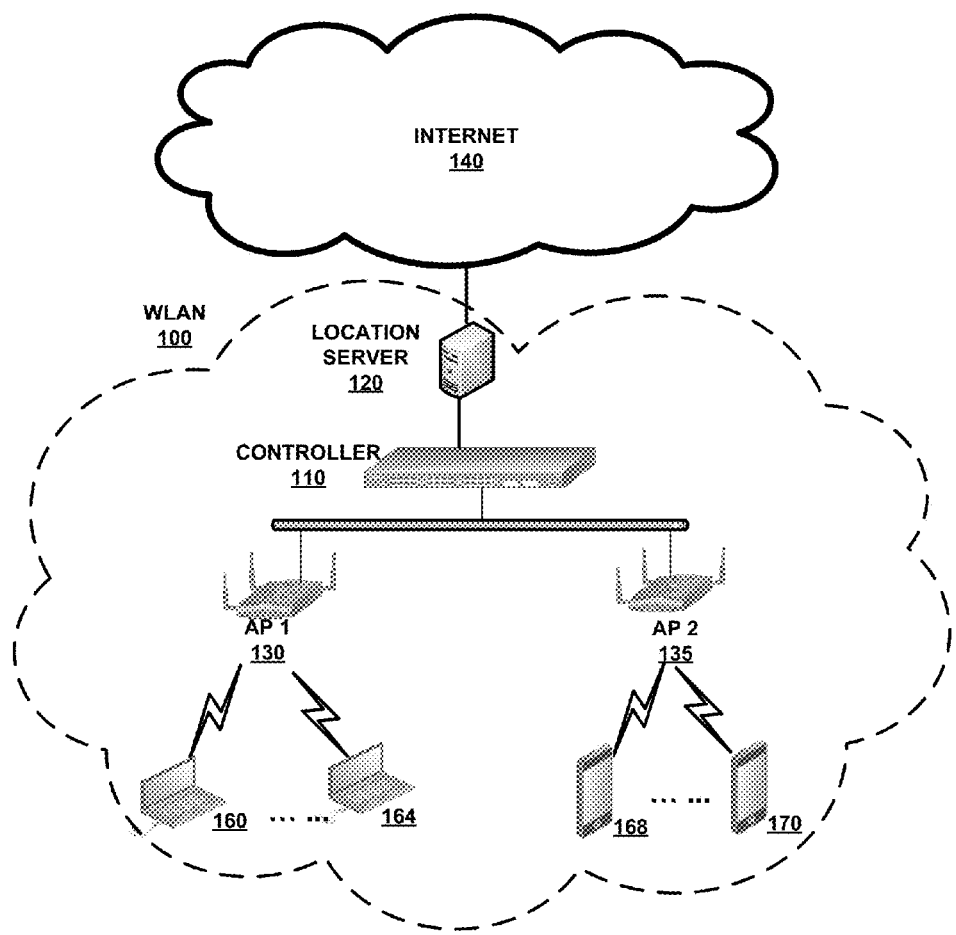
FIG. 1 shows an exemplary wireless digital network environment according to embodiments of the present disclosure.

In the following description, several specific details are presented to provide a thorough understanding. While the context of the disclosure is directed to virtual broadcast domains or groups in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to location services in a wireless local area network. In particular, the present disclosure relates to improve location accuracy in multi-channel wireless networks through the coordination of receiving and transmitting functions of wireless access points with regards to wireless devices.

With the solution provided herein, the disclosed network device configures a first access point to transmit a beacon frame on a first channel during a particular time period. The disclosed network device then generates the beacon frame to include false information indicating that data for a client device has been received by the first access point and is available for transmission to the client device. Note that, no data has been received by the first access point for transmission to the client device. Further, the disclosed network device transmits the beacon frame including the false information to the client device. Subsequent to transmitting the beacon frame to the client device, the disclosed network device exchanges one or more packets with the client device. Then, the disclosed network device estimates a location of the client device based at least on packets received from the client device on the first channel.

Moreover, according to solution provided herein, a second disclosed network device identifies a time period during which a first network device is scheduled to communicate with a client device on a first channel. The second disclosed network device then switches from a second channel to the first channel based on the time period scheduled for communication between the first network device and the client device. The second disclosed network device also receives one or more frames from the client device during the time period, and determines information associated with the client device based at least on one or more attributes associated with the one or more frames received from the client device.

According to the present disclosure, a serving access point (AP) generally refers to an AP serving client devices.

A neighboring AP or listening AP generally refers to an AP that obtains distance information for client devices that it is not serving.

A RTT or Round-Trip Time generally refers to the time to send a packet and obtain an ACK frame.

Polling generally refers to the act of an AP sending a data solicitation message, e.g., a NULL QOS frame, to client devices associated with the AP.

A wireless communication channel generally refers to a frequency and bandwidth that is contiguous and orthogonal. Thus, devices operating on one wireless communication channel cannot hear or transmit to devices operating on different channels, but in-range devices on the same wireless communication channel can interoperate.

Probing generally refers to client devices transmitting probe requests on multiple channels to determine whether there are available APs to connect to. As there are many channels, it is costly energy wise. As such, battery-powered client devices are expected to continue reducing their need to probe in the future.

Power-save generally refers to client devices turning off the Wi-Fi chipset in order to conserve battery life. Note that, there are several forms of power-save. The present disclosure mostly relates to the IEEE 802.11 power save techniques.

Limitations of applications generally refer to mobile devices having techniques to limit the power requirements of applications. Usually, when applications are not running in the foreground, the applications are frozen and cannot require the mobile device to perform anything, including transmitting on any wireless communication interface.

Scanning generally refers to the act of a Wi-Fi device (e.g., an AP or a client device) to periodically look at other channels to determine channel characteristics.

Computing Environment

FIG. 1 shows an exemplary wireless digital network environment according to embodiments of the present disclosure. FIG. 1 includes a location server 120 that connects to a controller 110 in a wireless local area network (WLAN) 100. WLAN 100 is also connected to Internet 140. Controller 110 is communicatively coupled with one or more access points, such as AP1 130 and AP2 135, to provide wireless network services, including location services to a number of wireless client devices.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with AP1 130, and client devices 168-170 are associated with AP2 135. Note that, client devices may be connected to the access points via wired or wireless connections.

During operations, a wireless station, such as client device 160, client device 164, or client device 168, is associated with a respective access point, e.g., access point AP1 130, access point AP2 135, etc. Moreover, if a client device (e.g., client 160) moves from a first physical location to a second physical location, the client device (e.g., client 160) may be disassociated with its current servicing access point (e.g., AP1 130 servicing the first physical location) and associate with a new servicing access point (e.g., AP2 135 servicing the second physical location).

Moreover, location server 120 supports a platform integrated with WLAN 100 that powers location-aware applications for various enterprise venues. For example, a location engine (which can be a part of controller 110, not shown) sends location data from triangulated APs to location server 120. Location server 120 can be a part of WLAN 100, or can be a cloud-based server. Also, note that location 120 is capable of providing real-time location services for client devices in WLAN 100. Furthermore, location server 120 can provide a security layer between enterprise IT infrastructure and external access. Thus, complicated firewalls and Virtual Private Networks (VPNs) are not required to leverage location server 120.

According to embodiments of the present disclosure, location server 120 can store location information gathered by a location engine from the network. The location engine and/or location server 120 can process location information and share it through a standard Application Programming Interface (API). In particular, the location engine is pre-configured with the access point (AP) placement data in order to calculate locations for client devices serviced by the access points in the network. This AP placement data may be presented as a map and imported from a network monitoring module. The location engine can then calculate associated and/or unassociated client device locations via triangulation, for example, at a default fixed interval. Location information that is provided by the location engine and stored by location server 120 may include, but is not limited to: client's username, Internet Protocol (IP) address, Media Access Control (MAC) address, device type, application firewall data, destinations and applications used by associated devices, current location, historical location, etc. In some embodiments, personal identifying information (PII) can be filtered out of the data, allowing network administrator or clients to view standard or anonymized data with or without MAC addresses, client user names, and IP addresses.

According to embodiments of the present disclosure, a client device (e.g., client device 160) will periodically send out probe requests to its neighboring access points (e.g., access point 130 and access point 135) in an attempt to connect to WLAN 100. The probe requests contain information that would allow the neighboring access points in a wireless network to determine the location of the client device.

However, as mentioned above, these probe requests are transmitted infrequently by some client devices, and some mobile device manufacturers have deprecated the use of the client probing protocol for the benefit of preserving device battery life. Therefore, the number of signal samples (such as probe requests) received by the neighboring access points of the client device may not provide enough information that allows for accurate location of the client device. Therefore, it is desirable to improve accuracy of location server by increasing the number of signal samples that the access points in WLAN 100 can collect from the client devices.

Generation of Beacon Frame with False Information

A. Probing Frames from Client Devices

Figure 2:
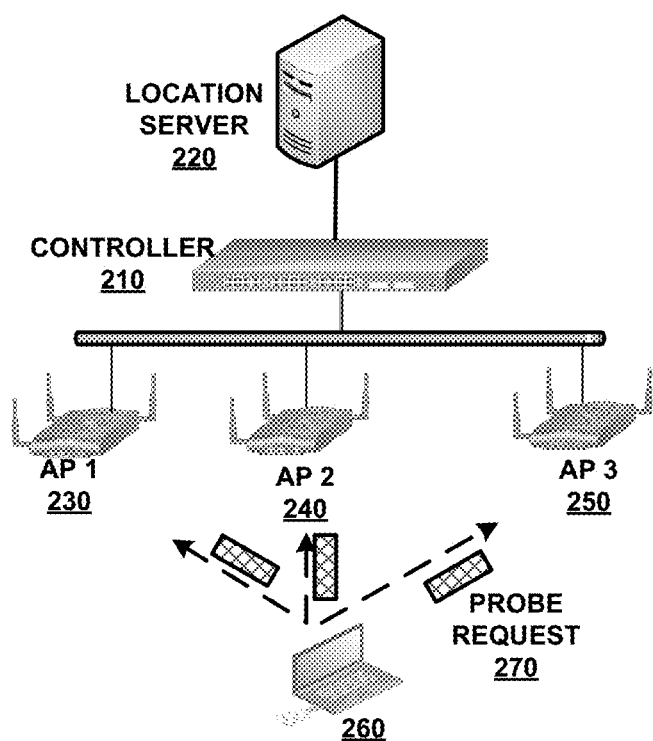
FIG. 2 illustrates a diagram showing exemplary WLAN environment providing improved location accuracy in a multi-channel wireless network according to embodiments of the present disclosure.

FIG. 2 illustrates a diagram showing exemplary WLAN environment providing improved location accuracy in a multi-channel wireless network according to embodiments of the present disclosure. FIG. 2 includes a network management device (such as controller 210), which may include a location engine that gathers, processes, and shares real-time location data of client devices in the network. Further, controller 210 can be connected to a location server 220. Location server 220 stores real-time as well as historical location data of client devices in the network to facilitate accurate location services by the network.

Controller 210 is also connected to a number of other network devices, such as access points AP1 230, AP2 240, AP3 250, etc. Multiple client devices can be associated with each access point at any time. For example, as illustrated in FIG. 2, client device 260 may be associated with AP2 240.

In addition, client devices in a wireless network often periodically send frames, such as probe requests, to discover access points in their physical proximity. For example, client device 260 may be periodically sending probe request 270 via one or more wireless communication channels, which may be received by one or more of the access points located within the physical neighborhood of the client device, e.g., AP1 230, AP2 20, and AP3 250. Each access point may reply to probe request 270 received from client device 260 with a probe response. Subsequently, client device 260 may determine which access point is the best one to connect to, based on information associated with frames (e.g., probe response) received from different neighboring access points.

In some embodiments, multiple APs in the network may be communicating with client devices on the same wireless communication channel. In other embodiments, different APs may be communicating with different clients on a number of different wireless communication channels supported by the wireless network.

B. Determination of Location

Figure 3:
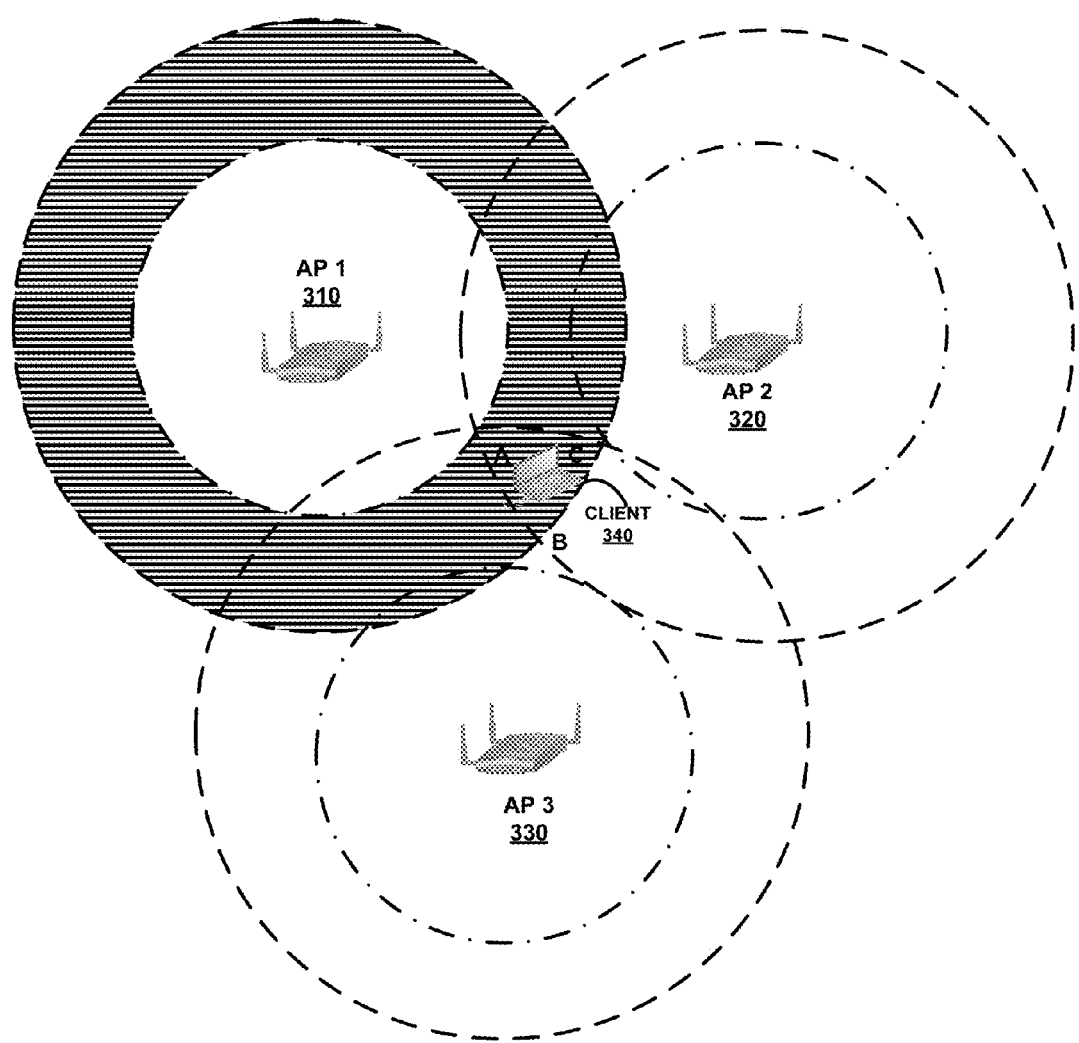
FIG. 3 illustrates exemplary determination of location of a client device according to embodiments of the present disclosure.

FIG. 3 illustrates exemplary determination of location of a client device according to embodiments of the present disclosure. In FIG. 3, there are three access points, such as AP1 310, AP2 320, and AP3 330, that are located within the physical proximity of client device 340.

When an access point (e.g., AP1 310) receives a frame, such as a probe request, from client device 340, the access point determines a signal strength associated with the frame. Moreover, the access point will transmit the signal strength as well as device information associated with client 340 to a location server in the WLAN.

Since the frame is transmitted by client device 340 over the air on a particular wireless communication channel, any access point operating on the same communication channel within the neighborhood of client device 340 will receive the frame sent by client device 340. When multiple APs (e.g., AP1 310, AP2, 320, AP3 330) receive the frame at or around the same time from client device 340, each AP will separately determine a respective signal strength associated with the frame and transmit the signal strength associated with the frame to the location server.

When the location server receives multiple reports from different APs, the location server can use triangulation techniques to determine the location of client device 340. To do this, the location server will be pre-configured with location information associated with each of the APs. Based on the signal strength reported by a respective AP, the location server can infer a coverage area in which client device 340 is likely to be located. For example, location server may determine that client 340 is located within the shaded ring area around AP1 310 as illustrated in FIG. 3 based on a first signal strength of the frame that AP1 310 receives from client 340. Likewise, location server may determine that client device 340 is likely to be located with the ring area around AP2 320 based on a second signal strength of the frame that AP2 320 receives from client 340; and, location server may further determine that client device 340 is likely to be located with the ring area around AP2 320 based on a third signal strength of the frame that AP3 330 receives from client 340. Therefore, the location server can determine that client device 340 is located within the overlapping area ABC of the three different ring areas centered on AP1 310, AP2 320, and AP3 330, respectively.

Note that, in order to locate client device 340, there needs to be at least three separate reports from three different APs that are received by the location server. The location server is able to provide more accurate location of client device 340, if more reports are received from different APs in the neighborhood, or if multiple reports are received from the same AP within a short period of time with regards to the same client device. Therefore, ideally, the location server would be able to provide accurate location of client devices in the network if the location server can receive reports associated with the same client device from four or more APs in the network around the same period of time. In some embodiments, the signal strength is measured as received signal strength indicator (RSSI), which generally provides an estimation of how far away a client is from an access point.

Depending on the wireless standards that the WLAN is configured to support, an AP can use multiple different wireless communication channels to communicate in the WLAN. Although each AP (such as AP1 310, AP2 320, AP3 330) is capable of communicating on multiple different wireless communication channels, each AP is dynamically configured to be communicating on one particular wireless communication channel, which typically is different from the wireless communication channels that its neighboring APs use to minimize signal interferences and maximize the utilization of each available wireless communication channel.

In some embodiments, alternative to or in addition to probe requests from the client device, APs in the network can also determine a signal strength associated with an acknowledgment frame (ACK) received the client device, and report the signal strength to the location server. In a typical WLAN, client devices usually send out ACK frames more frequently than periodical probe requests. Thus, adding or using ACK frames would allow more signal sample to be collected by the APs and reported to the location server.

Nevertheless, when a client device, such as client device 340, communicates to an AP in the network, such as AP1 310, all of the communications will happen on a particular wireless communication channel. An AP on one wireless communication channel cannot hear to communicate with a client device or a network device (such as another AP) on a different wireless communication channel. Therefore, AP2 320 and AP3 330 will not hear the wireless communication between AP1 310 and client device 340, including the acknowledgment frames sent from client device 340 to AP1 310, because ACK frames from client devices are usually sent on a current operating channel. Accordingly, AP2 320 and AP3 330 will not be able to collect ACK signal samples transmitted on a different wireless communication channel, and will not able to report those to the location server.

By contrast, when client device 340 attempts to look for neighboring APs by sending out probe requests, client device 340 can hop through each of the wireless communication channels supported by the WLAN to send the probe request. Thus, multiple APs would be able to hear the probe request from the client device even though they are operating on different wireless communication channels. This would allow multiple APs in the neighborhood to provide multiple reports about a signal received from the same client device 340.

C. Communication Mechanism in Power-Save Mode

When a client device is in power save mode, the Wi-Fi chip on the client device will be turned off. Thus, the client device in the power save mode will stop listening for packets that are transmitted to the client device. Also, the client device will stop sending packets to other devices in the network as well. IEEE 802.11 standards support a mechanism for an AP to communicate with a client device while the client device is in power save mode.

Specifically, an AP may send out beacon frames at a fixed interval, e.g., every 100 milliseconds. Beacon frame generally refers to one of the management frames in accordance with IEEE 802.11 standard-based WLANs. For example, beacon frame may contain information about the network, such as Service Set Identifier (SSID). Beacon frames are transmitted periodically by the APs to announce the presence of a WLAN. Also, beacon frames can be packets sent by an access point periodically to synchronize a wireless network.

Moreover, a Delivery Traffic Indication Message (DTIM) interval is configured for the network. DTIM is a type of traffic indication map (TIM) which informs the clients about the presence of buffered multicast/broadcast data on the access point. In some embodiments, DTIM is generated within the periodic beacon frame at a frequency specified by the DTIM Interval. Normal TIMs that are present in every beacon frame are for signaling the presence of buffered unicast data. After a DTIM, the access point will send the multicast/broadcast data on the channel.

Note that, IEEE 802.11 standards define a power-save mode for client devices. In power-save mode, a client device may choose to sleep for one or more beacon intervals prior to waking for beacon frames that include DTIMs. For example, when the DTIM period is 2, a client device in power-save mode may be awaken to receive every other beacon frame transmitted by the access point that the client device is associated with.

More specifically, according to some embodiments, prior to entering a power-save mode, a client device will transmit a notification to the access point that the client device is associated with, that the client device will be entering power-save mode, such that the access point will know how to store unicast traffic destined for the client device while the client device is in the power-save mode. Then, the client device will begin to sleep according to the DTIM period. The higher the DTIM period, the longer a client device may sleep, and therefore the more power that particular client device may potentially save.

Different client devices in wireless networks may have different requirements for power consumption and communication and that may affect how often a client device enters power save mode. For example, laptop computers may require relatively high communication throughput and may have low sensitivity to power consumption. Thus, a relatively low DTIM period may be suitable for the laptop computers. Mobile devices, however, may require relatively low communication throughput and may be operated by batteries of relatively low capacity. Therefore, a relatively high DTIM period may be suitable for the mobile devices. Moreover, for devices having a medium to high communication throughput while still having small batteries, a medium DTIM period may be most suitable.

D. Generation of Beacon Frame with False Information

It is important to note that, a client device in power-save mode may elect to wake up right before the DTIM interval, listen for the beacon frame transmitted by the access point at the DTIM interval, and inspect the beacon frame. In some embodiments, the beacon frame includes information (e.g., a bit and a client identifier), which indicates that the AP has unicast data packets specifically for an identified client device.

After the client device receives the beacon framing including the bit, the client device determines whether the AP has any unicast data packets based on the bit and the client device identifier in the beacon frame. If the client device determines that the AP has unicast data packets for it, the particular client device, the client device will then transmit a notification packet to the AP indicating that the client device is ready to receive the unicast data packets destined for the client device, and that the AP can proceed with sending the unicast data packets to the particular client device.

Thereafter, upon receiving the notification packet from the client, the AP will transmit the unicast data packets to the particular client device. After the client device finishes receiving the unicast data packets transmitted by the AP, the client device will go back to sleep in the power-save mode.

In one embodiment, assuming that all of the access points in a wireless network are operating on the same wireless communication channel. If the client devices, esp. mobile devices, are configured to enable power-save mode, the AP will not be able to collect enough frames (e.g., probe request, or ACK frames) from the client devices to calculate their locations.

Figure 4:
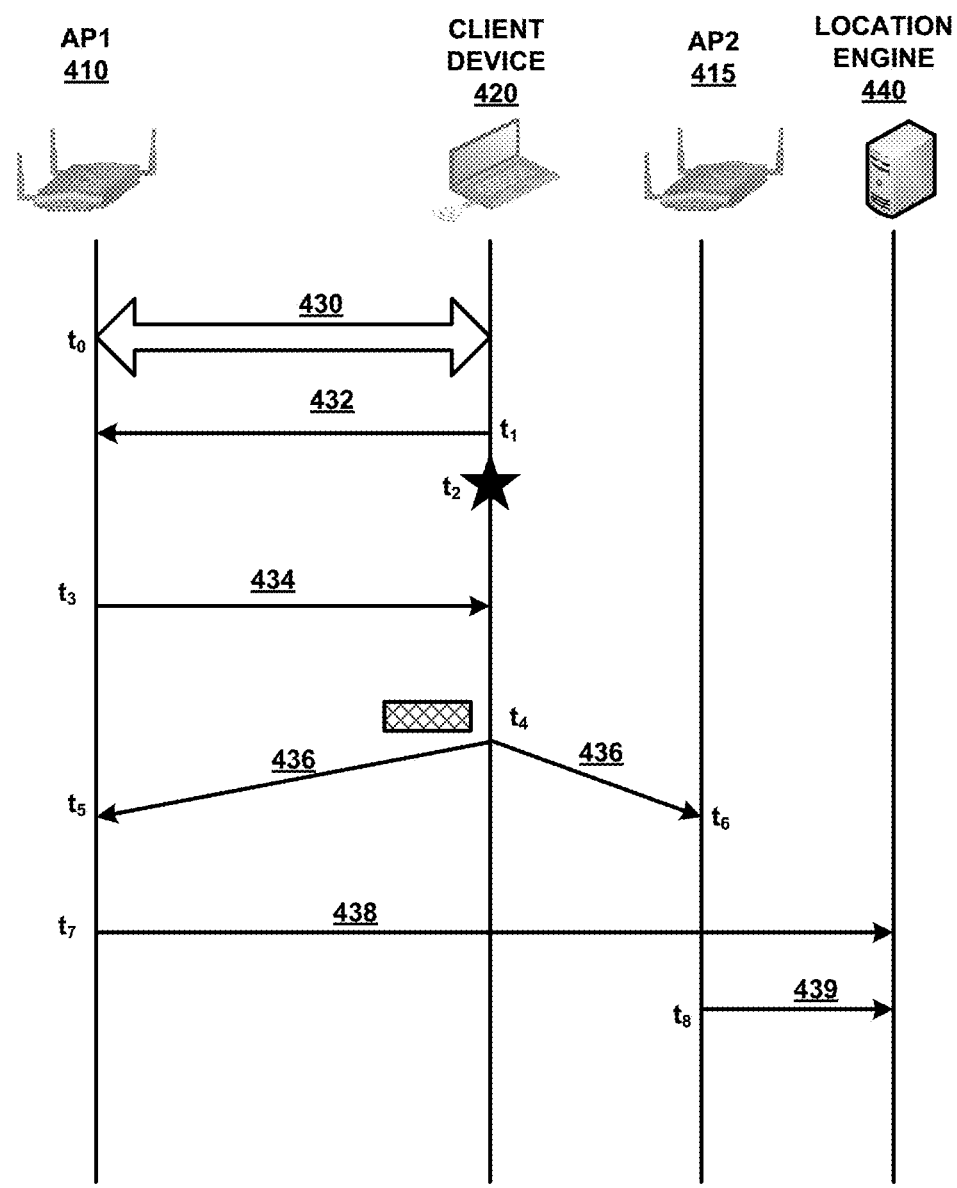
FIG. 4 illustrates an exemplary modified communication mechanism for improving location accuracy according to embodiments of the present disclosure.

In order to increase the number of samples collected from client devices for accurately locating the client devices, the AP may modify the mechanism described above. FIG. 4 illustrates an exemplary modified communication mechanism for improving location accuracy. FIG. 4 includes client device 420, a number of APs located within the physical neighborhood of the client device and operating on the same wireless communication channel as the client device, such as AP1 410 and AP2 415, location server 440, etc. Initially, at time point $t_0$, client device 420 is associated with access point AP1 410 as indicated by the communication exchanges 430 between AP1 410 and client device 420. At time point $t_1$, client device 420 sends AP1 410 a notification 432 that the client device is about to enter into power-save mode. Subsequently, at time point $t_2$, client device 420 enters into power-save mode, and only wakes up at DTIM intervals to listen for beacon frames transmitted from AP1.

At time point $t_3$, although no data destined for client device 420 has been received at AP1 410, for the purpose of soliciting more signal samples from the client device, AP1 410 may send a data notification message 434 to client device 420, indicating that AP1 410 has received data destined for the client device. Because AP1 410 does not actually have the data for the client device, data notification message 434 is a beacon frame that contains false information.

At time point $t_4$, client device 420 replies to the data notification message by sending a packet 436 to AP1 410, indicating that client device 420 is ready to receive data packets. As illustrated in FIG. 4, packet 436 is received by AP1 410 at time point $t_5$. Also, because packet 436 is sent over client device 420's operating wireless communication channel, any other network devices within the physical neighborhood of the client device that are operating on the same wireless communication channel will be able to hear packet 436. For example, AP2 415 also receives a copy of packet 436 at time point $t_6$.

Next each AP in the neighborhood independently determines a signal strength associated with packet 436 that each AP receives from client device 420, and transmits the signal strength and client device identification to location server 440. For example, AP1 410 sends a first report 438 including the signal strength and other information associated with packet 436 to location engine 440 at time point $t_7$; AP2 415 sends a second report 439 including the signal strength and other information associated with packet 436 to location server 440 at time point $t_8$; etc.

After location engine 440 receives a number of reports (e.g., report 438 and report 439) associated with the same client device from different APs, location engine 440 will calculate the location of the client device based at least on the signal strengths in the received reports, as well as pre-configured AP location information.

Moreover, after AP1 410 receives packet 436 from client device 420, AP1 410 may transmit a special packet (not shown) to client device 420. In some embodiments, the special packet can be a null data frame, such as a QoS NULL data frame. Note that, a null data frame generally refers to a control frame that contains no data but flag information. Upon receiving the special packet, client device 420 will send an ACK frame to AP1 410. The ACK frame will be heard by other neighboring APs communicating on the same wireless communication channel, such as AP2 415. Thus, both AP1 410 and AP2 415 can determine the signal strength associated with the ACK frame as received by each access point, and transmit the signal strength information in a report to location engine 440 to provide additional signal samples for improving the location accuracy of client device 420.

Figure 5:
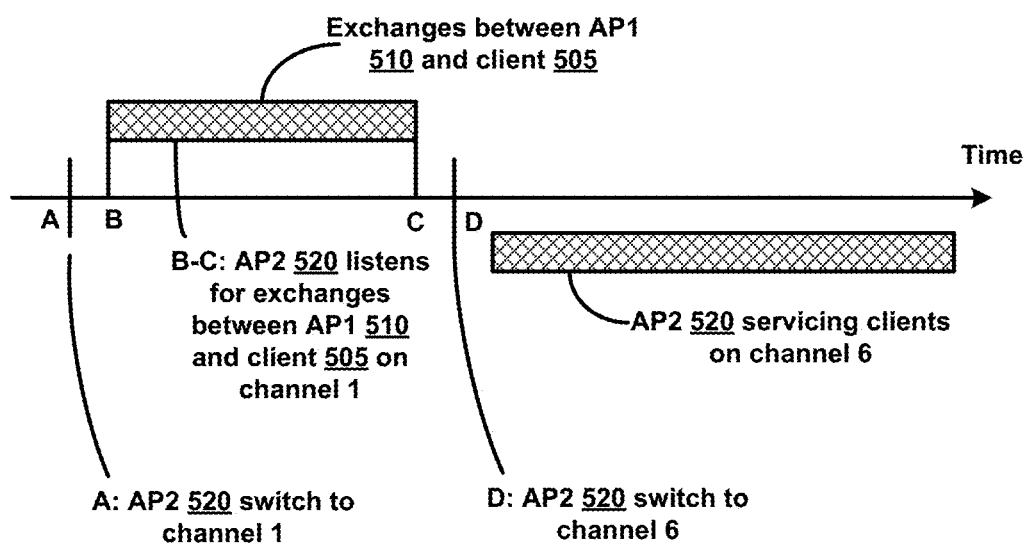
FIG. 5 illustrates an exemplary coordination of multiple access points operating on different wireless communication channels in accordance with the present disclosure.

Coordination of Multiple Access Points Operating on Different Wireless Communication Channels FIG. 5 illustrates an exemplary coordination of multiple access points operating on different wireless communication channels in accordance with the present disclosure. For ease of illustration, FIG. 5 includes two APs in the wireless network, e.g., AP1 510 operating on channel 1 and AP2 520 operating on channel 6. Further, FIG. 5 shows a time sequence diagram illustrating an exemplary coordination between AP1 510 and AP2 520 for collecting data from clients to improve location accuracy in a multi-channel wireless network. In the example illustrated in FIG. 5, assuming that client device 505 is associated with AP1 510 on wireless communication channel 1, and that AP2 520 is physically located within the neighborhood of both client device 505 and AP1 510.

Each access point has a built-in scanning mechanism. For example, an access point that is operating on channel 6 can switch to channel 1 for a short period of time and listen on channel 1, and return expeditiously to channel 6 to continue servicing its client devices. Using the built-in mechanism, an AP can learn information about other APs operating on different wireless communication channels. Similar to a client device which can determine DTIM interval of its associated AP, e.g., AP1 510, other APs in the network operating on different channels can also obtain the DTIM interval. Therefore, AP2 520 can determine when AP1 510 will be sending its beacon frames.

In addition, APs may transmit information about which DTIM intervals the AP will solicit information from connected power save and non-power save clients. In one implementation, the information is transmitted as vendor specific information in the beacon.

In some embodiments, the AP control plane may facilitate APs to share with each other additional information regarding when each AP will solicit data from its associated client devices, e.g., via generation of beacon frames containing false information as described in the above section. Therefore, as illustrated in FIG. 5, when AP2 520 learns that its neighboring AP AP1 510 will be soliciting data from its client devices, at time point A, AP2 520 can switch to channel 1 from channel 6. Note that, the switch may happen shortly before AP1 510 starts soliciting data from client device 505 at time point B.

For the duration between time point B and time point C, AP2 520 can then listen for the exchanges between AP1 510 and client device 505 on channel 1. Note that, the exchanges may include, but are not limited to, a probe request from client device 505, a notification message from client 505 indicating that the client is ready to receive data from AP1 510, an ACK frame from client 505 indicating that the client has received the data frame (e.g., a null data frame) transmitted by AP1 510, etc.

After the exchanges between AP1 510 and client device 505 complete, at time point D, AP2 520 may switch back to channel 6, and continue to service its own client devices on channel 6. Because both AP1 510 and AP2 520 have received frames transmitted from client device 505 during the time period between B and C, both AP1 510 and AP2 520 can determine the respective signal strength of packets they received and send a report to the location server with such information to facilitate more accurate calculation of the location of client device 505.

In other words, to coordinate with other APs and improve location accuracy of client devices, each AP can (a) obtain a schedule of another neighboring AP; (b) switch to the operating channel of the neighboring AP at a scheduled time for communication exchanges between the neighboring AP and the client device, (c) listen to the communication exchanges between the neighboring AP and the client device; (d) collecting signal samples, e.g., signal strength associated with messages originated from the client device; and (e) send the report to the location engine to allow the location engine collect more signal samples associated with the client device, thereby more accurately determine the location of the client device; etc.

Note that, when an AP switch to the operating channel of its neighboring AP, the AP may listen to communication exchanges between the neighboring AP and not only just one particular client device, but also multiple (or even all of) client devices associated with the neighboring AP. The client devices may not even be clients in power save mode.

In addition, an AP may be sending data solicitation message to its client devices at a longer interval than the DTIM interval to avoid collecting too much data too frequently from the client devices. Therefore, an AP may be configured to send out the data solicitation message to its associated client device at every 3 DTIM intervals, which can be configured by a network administrator.

Also, it is important to note, a servicing AP can have any schedule for the data solicitation of its client devices. As long as the schedule is shared with its neighboring APs, the neighboring APs can switch to the operating channel of the servicing AP prior to the scheduled solicitation for subsequent communication exchanges between the servicing AP and its associated client devices.

In one particular embodiment, a servicing AP selects a prime number p. At every p×DTIM intervals, the servicing AP will send a data solicitation message, for example, a QoS NULL frame, to its associated client devices. Note that, the servicing AP is configured with a DTIM interval. Thus, at every DTIM interval, client devices associated with the servicing AP may wake up and listen for beacon frames transmitted from the servicing AP. However, the data solicitation message is sent on a less frequent basis, e.g., at every 5 DTIM intervals. Thus, at every 5 DTIM intervals, the servicing AP may send a beacon frame containing false data indications to all of its client devices in power save mode that the servicing AP has data packets waiting for each power save client device. The prime number p (and thus the time interval for data solicitation message) is shared between the servicing AP and neighboring APs, e.g., via coordination of a control-plane device. It is then up to each neighboring AP to determine whether the neighboring AP will switch the operating channel of the servicing AP at every p×DTIM intervals to listen for the communication exchanges.

Not all client devices will wake up every DTIM interval. Some client devices may wake up at multiple DTIM intervals selected by the client device, e.g., every 2 or 4 DTIM intervals. The prime number is selected such that, for these client devices, even though they do not wake up at every DTIM interval but at every 2 or 4 DTIM intervals, the p×DTIM interval will still coincide at regular intervals with the multiple DTIM intervals at which the client device chooses to wake up periodically.

In some embodiments, the APs in the same neighborhood may utilize a mechanism to avoid sending their data solicitation messages to their client devices at overlapping intervals. For example, all APs in the same neighborhood may be powered up at the same time. However, a control-plane device can randomly delay the start of service time for each AP in the neighborhood. In some embodiments, AP devices may use uniquely random numbers to achieve a randomization delay. Thus, the APs will likely avoid overlapping their data solicitation messages. Alternatively, when two APs are detected to have a conflicting schedule, a control-plane device may resolve the conflict by changing one or more of the schedules.

In some embodiments, the disclosed system may utilize Round-Trip Time (RTT) exchange mechanism. In general, RTT relies on an AP to send a plurality of communication exchange messages. By using the mechanism described above, another neighboring AP on a different channel will know when a client device in power-save mode that is associated with a servicing AP will be awake. Thus, the neighboring AP can switch to the operating channel of the servicing AP prior to the client device becomes awake, and start RTT communication exchange messages with the client device. Thus, instead of sending a data solicitation message, off-channel APs can also exchange RTT messages with a client device, which typically involves, e.g., multiple packet exchanges, to collect distance information associated with a particular client device. Note that, similar to the signal strength (e.g., RSSI), the RTT distance measurements can also be used for calculating the location of a particular client device. For example, the location engine may use triangulation of three or more RTT distances associated with a particular client device to locate the client device. The RTT distance measurements allow for enhanced location accuracy in a multi-channel wireless network.

Processes for Improving Location Accuracy in Multi-Channel Wireless Networks

Figure 6A:
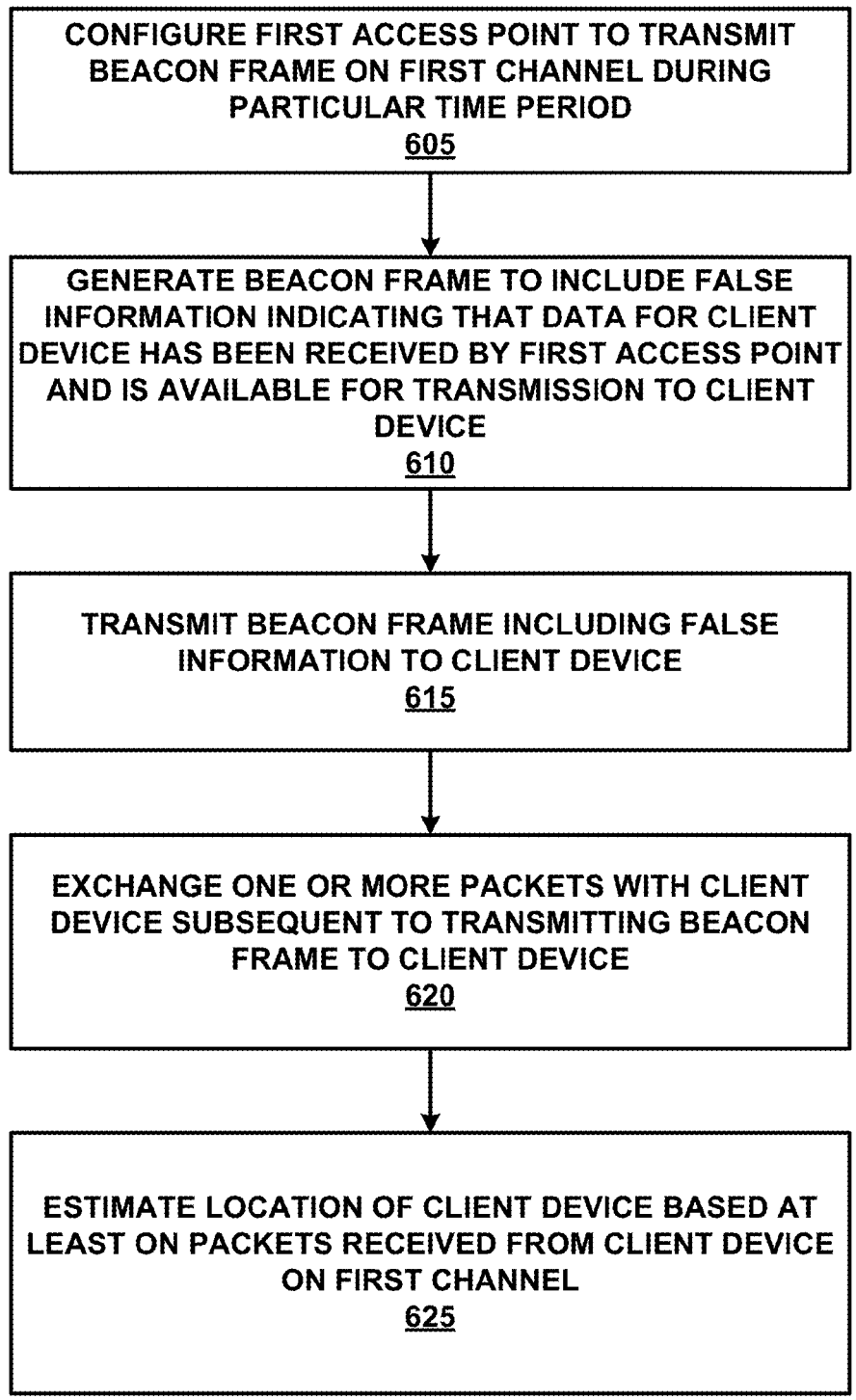
FIG. 6A shows a flowchart for an exemplary process for improving location accuracy in multi-channel wireless networks according to embodiments of the present disclosure.

FIG. 6A shows a flowchart for an exemplary process for improving location accuracy in multi-channel wireless networks according to embodiments of the present disclosure. During operations, a network device (such as an access point) configures a first access point to transmit a beacon frame on a first channel during a particular time period (operation 605). Then, the network device generates a beacon frame to include false information indicating that data for a client device has been received by first access point and is available for transmission to the client device (operation 610). The information is false because no data actually has been received by the first access point for transmission to the client device. Further, the network device transmits the beacon frame including the false information to the client device (operation 615). Subsequent to transmitting the beacon frame to the client device, the network device exchanges one or more packets with the client device (operation 620). Next, the network device estimates a location of the client device based at least on packets received from the client device on the first channel (operation 625).

In some embodiments, the packets received from the client device are acknowledgement frames (e.g., ACKs).

In some embodiments, the location estimation is based on a time period between transmission of packets to the client device and receiving the acknowledgement frames corresponding to the packets transmitted to the client device. Also, the location estimation can be based on one or more signal strengths (such as RSSIs) associated with packets received from the client device.

Moreover, a schedule, with which beacon frames including the false information for the client device are transmitted, is selected based on attributes associated with the client device. The attributes associated with the client device may include, but are not limited to, whether the client device belongs to a particular list, is of particular interest, is to be tracked immediately, location attributes of the client device, the AP with which the client device is associated, etc.

Figure 6B:
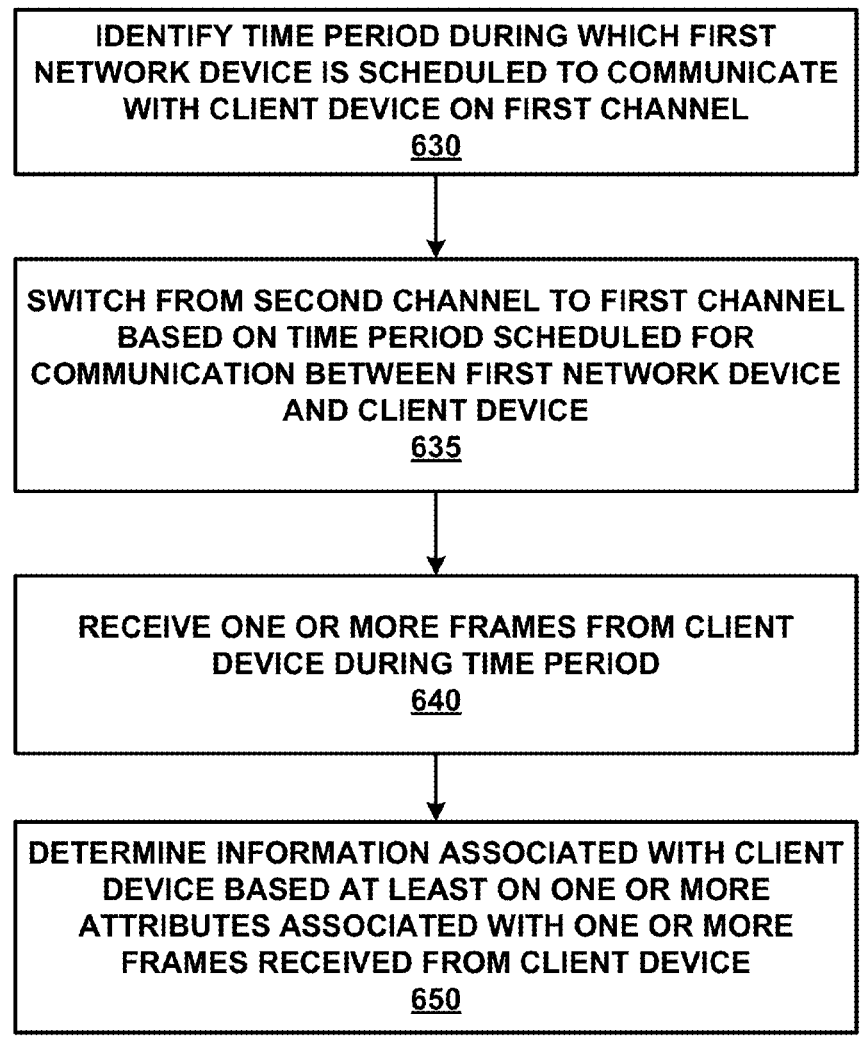
FIG. 6B shows a flowchart for another exemplary process for improving location accuracy in multi-channel wireless networks according to embodiments of the present disclosure.

FIG. 6B shows a flowchart for an exemplary process for improving location accuracy in multi-channel wireless networks according to embodiments of the present disclosure. During operations, a second network device (such as an access point) identifies a time period during which a first network device is scheduled to communicate with a client device on a first channel (operation 630). The second network device then switches from a second channel to the first channel based on the time period scheduled for communication between the first network device and the client device (operation 635). Next, the second network device receives one or more frames from the client device during the time period (operation 640). Further, the second network device determines information associated with the client device based at least on one or more attributes associated with the one or more frames received from the client device (operation 650).

In some embodiments, the one or more frames received from the client device are responsive to data transmitted by the second network device to the client device. In some embodiments, determining the information is further based on frames received by the second network device from the first network device.

Furthermore, the time period is identified based on a schedule for transmitting beacon frames by the first network device. In some embodiments, the time period is identified based on a schedule for transmitting beacon frames at particular DTIM intervals. In some embodiments, the time period is identified based on a schedule of the client device for entering and/or exiting a power saving mode. In some embodiments, the time period is determined by a controller, and is communicated to the first network device and the second network device by a network controller device.

In some embodiments, the second network device is configured to switch to the first channel on a subset of time periods during which communication between the first network device and the client device has been scheduled. In other embodiments, the second network device is configured to switch from the second channel to the first channel by a network device other than the second network device. An example of the network device other than the second network device could be a network controller device, the first network device, other access points, etc. Specifically, a second access point may decide when to switch channel based on a schedule published by a first access point in the neighborhood.

In some embodiments, the second network device is an access point configured to provide network access to client devices using the second channel. The information associated with the client device comprises a location of the client device.

In some embodiments, the first network device is configured to transmit a beacon frame comprising false information indicating that data for the client device is received by the first network device for the client device, wherein no data is received by the first network device for the client device.

In some embodiments, the second network device is configured for tracking the client device by switching to any channel on which data is to be transmitted to the client device.

In some embodiments, the second network device is configured for tracking the client device by switching to a channel used by any network device in communication with the client device.

Moreover, a client device can be assigned to a group based on its radio behavior as determined by monitoring the client device. The network device can later take an action based on the client device belonging to a particular group.

System for Improving Location Accuracy in Multi-Channel Wireless Networks

Figure 7:
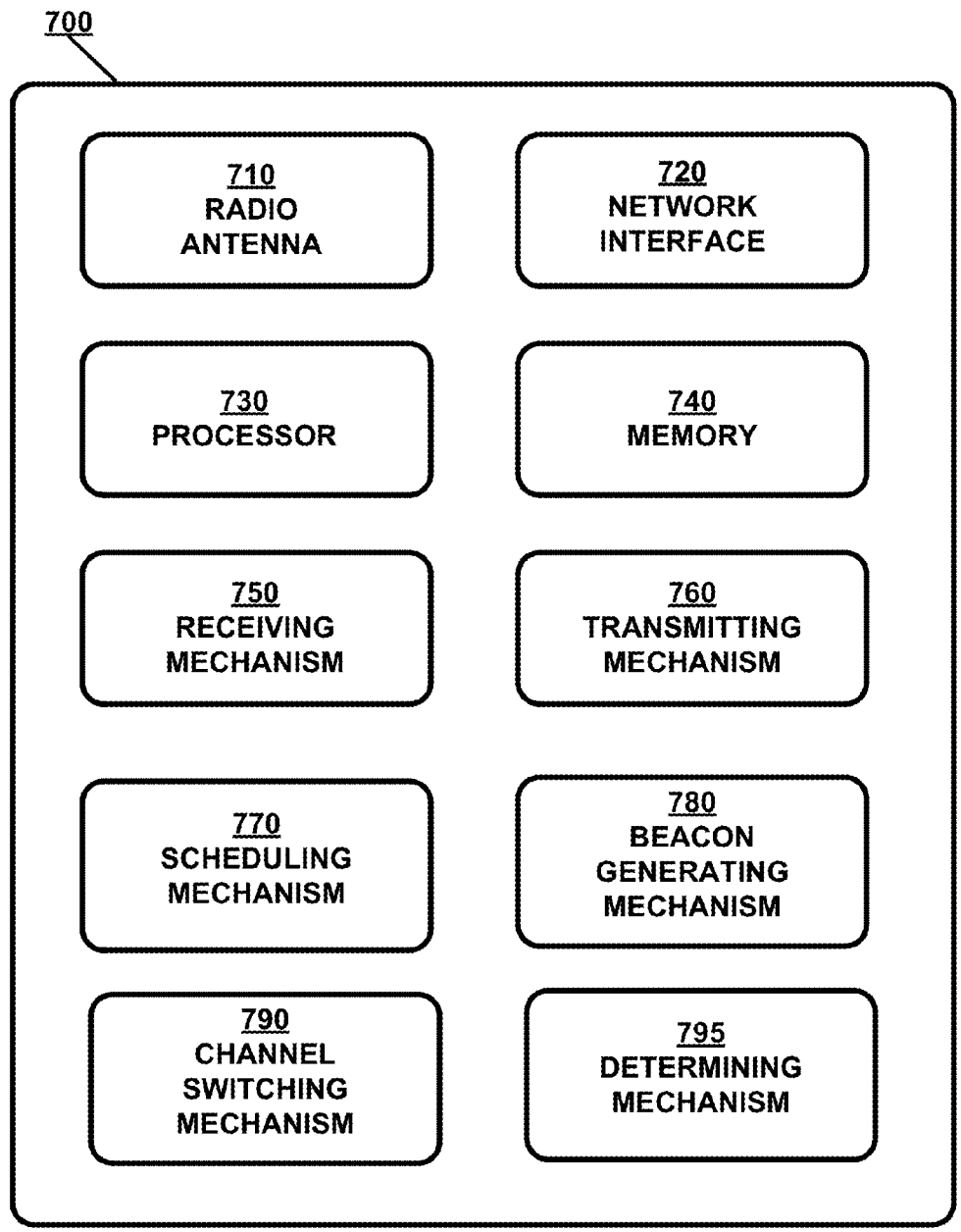
FIG. 7 is a block diagram illustrating a system for improving location accuracy in multi-channel wireless networks according to embodiments of the present disclosure.

FIG. 7 is a block diagram illustrating a system for improving location accuracy in multi-channel wireless networks according to embodiments of the present disclosure.

Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, and a broadcast group determining mechanism 770, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on. In some embodiments, the packets received by receiving mechanism 750 from the client device are acknowledgement frames (e.g., ACKs). Moreover, receiving mechanism 750 may receive one or more frames from the client device during a particular time period. In some embodiments, one or more frames that receiving mechanism 750 received from the client device are responsive to data transmitted by a second network device to the client device. In some embodiments, the second network device is an access point configured to provide network access to client devices using the second channel. The information associated with the client device comprises a location of the client device.

Transmitting mechanism 760 generally transmits messages, which include, but are not limited to, requests and/or responses, beacon frames, management frames, control path frames, and so on. Transmitting mechanism 760 may be configured by a first access point to transmit a beacon frame on a first channel during a particular time period. Further, transmitting mechanism 760 may transmit the beacon frame including the false information to client devices. Subsequent to transmitting the beacon frame to the client device, receiving mechanism 750 and transmitting mechanism 760 can exchange one or more packets with the client device.

Scheduling mechanism 770 generally schedules when to transmit a certain type of beacon frames. A schedule, with which beacon frames including the false information for the client device are transmitted, is selected based on attributes associated with the client device. The attributes associated with the client device may include, but are not limited to, whether the client device belongs to a particular list, is of particular interest, is to be tracked immediately, location attributes of the client device, the AP with which the client device is associated, etc. Scheduling mechanism 770 of a second network device (such as an access point) can identify a time period during which a first network device is scheduled to communicate with a client device on a first channel.

Furthermore, the time period is identified based on a schedule for transmitting beacon frames by the first network device. In some embodiments, the time period is identified based on a schedule for transmitting beacon frames at particular DTIM intervals. In some embodiments, the time period is identified based on a schedule of the client device for entering and/or exiting a power saving mode. In some embodiments, the time period is determined by a controller, and is communicated to the first network device and the second network device by a network controller device.

Beacon generating mechanism 780 generally generates beacon frames to be transmitted to client devices in the network. For example, beacon generating mechanism 780 may generate a beacon frame to include false information indicating that data for a client device has been received by first access point and is available for transmission to the client device. The information is false because no data actually has been received by the first access point for transmission to the client device.

Channel switching mechanism 790 generally switches between an operating wireless communication channel and one or more scanning channels that neighboring network devices may operate on. Specifically, channel switching mechanism 790 switches from a second channel to the first channel based on the time period scheduled for communication between the first network device and the client device.

In some embodiments, channel switching mechanism 790 is configured to switch a second network device to the first channel on a subset of time periods during which communication between the first network device and the client device has been scheduled. In other embodiments, channel switching mechanism 790 is configured to switch the second network device from the second channel to the first channel by a network device other than the second network device. An example of the network device other than the second network device could be a network controller device, the first network device, other access points, etc. Specifically, a second access point may decide when to switch channel based on a schedule published by a first access point in the neighborhood.

In some embodiments, channel switching mechanism 790 is configured for tracking the client device by switching to any channel on which data is to be transmitted to the client device. In some embodiments, channel switching mechanism 790 is configured for tracking the client device by switching to a channel used by any network device in communication with the client device.

Determining mechanism 795 generally determines information that facilitates accurate location services in a multi-channel wireless network. For example, determining mechanism estimates a location of the client device based at least on packets received from the client device on the first channel. In some embodiments, the location estimation is based on a time period between transmission of packets to the client device and receiving the acknowledgement frames corresponding to the packets transmitted to the client device. Also, the location estimation can be based on one or more signal strengths (such as RSSIs) associated with packets received from the client device.

In some embodiments, determining mechanism 795 determines information associated with the client device based at least on one or more attributes associated with the one or more frames received from the client device. In some embodiments, determining mechanism 795 based its determinations on frames received by a second network device from a first network device.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
generating, by an access point, a beacon frame to include false information indicating that data for a client device has been received by the access point and is available for transmission to the client device, wherein no data is received by the access point for transmission to the client device;
transmitting, by the access point, the beacon frame including the false information to the client device on a first channel during a particular time period that occurs at specified intervals, where the particular time period is based on a schedule for transmitting the beacon frame;
subsequent to transmitting the beacon frame to the client device, receiving, by the access point, one or more packets with acknowledgement frames from the client device; and
transmitting, by the access point, the packets received from the client device on the first channel for estimation of a location of the client device.

2. The method of claim 1, wherein the estimating operation is based on a time period between transmission of packets to the client device and receiving the acknowledgment frames corresponding to the packets transmitted to the client device.

3. The method of claim 1, wherein the estimating operation is based on a signal strength of packets received from the client device.

4. The method of claim 1, wherein the schedule, with which beacon frames including the false information for the client device are transmitted, is selected based on attributes associated with the client device.

5. A non-transitory computer readable medium comprising instructions executable by a processor of a second access point to:
identify a time period based on a schedule occurring at specified intervals during which a first access point is scheduled to communicate with a client device on a first channel, where the schedule is determined by the first access point, and where the first access point remains on the first channel during the time period;
transmit a beacon frame comprising false information indicating that data for the client device is received by the first access point for the client device, wherein no data is received by the first access point;
switch from a second channel to the first channel based on the time period scheduled for communication between the first access point and the client device;
receive, by the second access point, one or more frames comprising an acknowledgement frame from the client device during the time period;
switch from the first channel back to the second channel upon expiration of the time period; and
determine information associated with the client device based at least on one or more attributes associated with the one or more frames received from the client device.

6. The medium of claim 5, wherein the one or more frames received from the client device are responsive to data transmitted by the second access point to the client device.

7. The medium of claim 5, wherein the information is determined further based on frames received by the second access point from the first access point.

8. The medium of claim 5, wherein the time period is identified based on the schedule for transmitting beacon frames by the first access point.

9. The medium of claim 5, wherein the time period is identified based on a schedule for transmitting beacon frames at particular DTIM (Delivery Traffic Indication Message) intervals.

10. The medium of claim 5, wherein the time period is identified based on a schedule of the client device for entering and/or exiting a power saving mode.

11. The medium of claim 5, wherein the second access point is configured to provide network access to client devices using the second channel.

12. The medium of claim 5, wherein the time period is determined by a controller, and wherein the time period is communicated to the first access point and the second access point by the controller.

13. The medium of claim 5, further comprising instructions executable by the second access point to switch to the first channel on a subset of time periods during which communication between the first access point and the client device has been scheduled.

14. The medium of claim 5, wherein the information associated with the client device comprises a location of the client device.

15. The medium of claim 5, further comprising instructions executable by the second access point to switch from the second channel to the first channel by a access point other than the second access point.

16. The medium of claim 5, further comprising instructions executable by the second access point to track the client device by switching to any channel on which data is to be transmitted to the client device.

17. The medium of claim 5, wherein the second access point is configured for tracking the client device by switching to a channel used by any access point in communication with the client device.

18. An access point comprising:
a processor;
a memory on which are stored instructions that cause the processor to:
obtain a schedule of time periods that occur at specified intervals during which a neighboring access point is scheduled to communicate with a client device on an operating channel of the neighboring access point, where the specified intervals are determined by the neighboring access point, and where the neighboring access point remains on the operating channel during the time periods;
transmit a beacon frame comprising false information indicating that data for the client device is received by the neighboring access point for the client device, wherein no data is received by the neighboring access point;

for each of the time periods in the schedule:
  switch from an operating channel of the access point to the operating channel of the neighboring access point based on the time periods scheduled for communication between the neighboring access point and the client device;
  receive one or more frames comprising an acknowledgement frame from the client device during the time period;
  switch back from the operating channel of the neighboring access point to the operating channel of the access point upon expiration of the time period; and
  determine information associated with the client device based at least on one or more attributes associated with the one or more frames received from the client device.

* * * * *